United States Patent [19]

Fortier

[11] Patent Number: 5,553,280
[45] Date of Patent: Sep. 3, 1996

[54] METHOD FOR PROVIDING CRITICAL TIME REACTIVE MANAGEMENT OF DATABASE TRANSACTIONS FOR SYSTEMS PROCESS

[75] Inventor: Paul J. Fortier, Portsmouth, R.I.

[73] Assignee: The United States of America as represented by the Secretary of the Navy, Washington, D.C.

[21] Appl. No.: 292,443

[22] Filed: Aug. 17, 1994

[51] Int. Cl.$^6$ ................................................ B06F 17/30
[52] U.S. Cl. ...................... 395/600; 395/650; 395/700; 364/942.5; 364/974.7; 364/975.5; 364/242.8; 364/280.5; 364/281.3; 364/282.4; 364/DIG.1; 364/DIG. 2
[58] Field of Search .................................. 395/600, 700, 395/650, 456, 463, 487

[56] References Cited

U.S. PATENT DOCUMENTS 5,210,871 5/1993 Lala et al. ................................ 395/650
5,473,599 12/1995 Li et al. .................................... 370/16

OTHER PUBLICATIONS

Neil Munro, "DOD Writing New SDI Software Policy Directive", Government Computer News, Vol. 7, No. 6, Mar. 18, 1988, p. 33.

Siddique et al., "Metastable-free Arbitrator Coordinates Processor", Electronic Design, vol. 36, No. 9, 14 Apr. 1988, pp. 107–111.

Strosnider et al., "Advanced Real–Time Scheduling Using the IEEE 802.5 Token Ring", Proceedings Real–Time Scheduling Using the IEEE 802.5 Token Ring, Huntsville, Alabama, 6–8 Dec. 1988, pp. 42–52.

Ozawa et al., "Efficient Algorithms for Distributed Query Processing in Star and Extended–Star Networks", 1988 IEEE International Symposium on Circuits and Systems, Espoo, Finland, 7–9 Jun. 1988, pp. 551–554.

Bibyabani et al., "The Intergration of Deadline and Criticalness in Hard Real–Time Scheduling", Proceedings. Real–Time SystemsSymposium, Huntsville Alabama, 6–8 Dec. 1988, pp. 152–160.

Ramamritham et al., "Distributed Scheduling of Tasks With Deadlines and Resource Requirements", IEEE Transactions on Computers, Vol. 38, No. 8, Aug. 1989, pp. 1110–1123.

Ramamritham et al., "Efficient Scheduling Algorithms for Real–Time Multiprocessor Systems", IEEE Transactions on Parallel and Distributed Systems, vol. 1, No. 2, Apr. 1990, pp. 184–194.

John Stankovic, "The Spring Architecture", Proceedings. Euromicro '90 Workshop on Real Time; Horsholm, Denmark, 6–8 Jun. 1990, pp. 104–113.

S. H. Son, "Scheduling Real–Time Transactions", Proceedings. Euromicro '90 Workshop on Real Time; Horsholm, Denmark, 6–8 Jun. 1990, pp. 25–32.

(List continued on next page.)

Primary Examiner—Thomas G. Black
Assistant Examiner—Paul R. Lintz
Attorney, Agent, or Firm—Michael J. McGowan; Prithvi C. Lall; Michael F. Oglo

[57] ABSTRACT

A method for providing critical time reactive management of database transactions includes the steps of providing a database distributed over a plurality of sites, each site being partitioned into a plurality of objects; providing a number of transactions to be performed on the database; assigning a dynamic weight to each transaction of the number of transactions; distributing the number of transactions to at least one of the plurality of sites of the database; and executing the transactions according to the dynamic weight. A system for carrying out the above method is also disclosed, and includes a database distributed over a plurality of sites, each site being partitioned into a plurality of objects; a device for providing a number of transactions to be performed on the database; and a device for assigning a dynamic weight to each transaction of the number of transactions, for distributing the transactions to at least one of the plurality of sites of the database, and for executing the number of transactions according to the dynamic weight.

18 Claims, 3 Drawing Sheets

OTHER PUBLICATIONS

Wedde et al., "Distributed Operating Systems Support for Scheduling Atomic Real–Time Transactions", Proceedings. Euromicro '90 Workshop on Real Time; Horsholm, Denmark, 6–8 Jun. 1990.

Hailpern, "Dynamic Reconfiguration in An Object–Based Programming Language With Distributed Shared Data", 11th International Conference on Distributed Computing Systems, Arlington, Texas, 20–24 May 1991, pp. 73–80.

John A. Stankovic, "Distributed Real–Time Computing: The Next Generation", Technical Report, University of Massachusetts, 3 Jan. 1992, pp. 1–16.

Hong et al., "Real–Time Transaction Scheduling: A Cost Conscious Approach", Technical Report UF–CIS–TR–92–043, University of Florida, (Gainesville, Florida 1992), 18 pages.

John A. Stankovic, "Real–Time Computing", Technical Report, University of Massachusetts, (Amherst, Ma., Apr. 16, 1992), 19 pages.

Ferguson et al., "Satisfying Response Time Goals in Transaction Processing", Proceedings of the Second International Conference on Parallel and Distributed Information Systems, San Diego, Calif, 20–22 Jan. 1993, pp. 138–147.

Cheng, "Scheduling Transactions in Real–Time Database Systems", Digest of Papers. COMPCON Spring '93, San Francisco, California, 22–26 Feb. 1993, pp. 222–231.

Katcher et al., "Engineering and Analysis of Fixed Priority Schedulers", IEEE Transactions on Software Engineering, vol. 19, No. 9, Sep. 1993, pp. 920–934.

Kim et al., "A Priority–Driven Concurrency Control Protocol Based on Data Contention Rates for Distributed Real–Time Database Systems", Proceedings TENCON '93 IEEE Region Conference on 'Computer, Communication, Control, and Power Engineering, Beijing, China, 19–21 Oct. 1993.

Ramamritham et al., "Scheduling Algorithms and Operating Systems Support for Real–Time Systems", Proceedings of the IEEE, vol. 82, No. 1, Jan. 1994, pp. 55–67.

METHOD FOR PROVIDING CRITICAL TIME REACTIVE MANAGEMENT OF DATABASE TRANSACTIONS FOR SYSTEMS PROCESS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (a) Field of the Invention

The invention pertains to the field of database management and, more particularly, to a method and apparatus for providing critical time reactive management of database transactions for a systems process such as a Mission Critical Computer System.

(b) Description of the Related Art

Traditional approaches to providing information management for a Mission Critical Computer System (MCCS) have been to provide ad hoc solutions which are tailored to a specific situation. Such implementations are hand crafted to each problem and provide a minimal level of versatility.

Conventional memory management approaches and database approaches both have shortcomings for applications such as MCCS. For example, conventional memory management approaches provide timely and prioritized access to information, but are not sufficiently accurate, secure and consistent when used in conjunction with powerful access methods which are needed in real-time applications such as MCCS. Database approaches, while providing accurate, secure and consistent access to information, do not provide the necessary prioritized access to this information.

For example, U.S. Pat. No. 4,961,139, to Hong et al., discloses a database management system for real-time applications which includes the option to "read-through-lock" to access data in locked data tables. Searching speed is improved through the use of "tuple" identifiers. However, data calls are still handled on a "first in first out" basis. Thus, calls which may be critical to the application must wait for the completion of all prior calls before they can be processed.

U.S. Pat. No. 4,881,166, to Thompson et al., discloses a method for consistent multidatabase transaction processing for permitting the correct execution of multiple concurrent transactions, each comprising one or more read and/or write operations, in a heterogeneous distributed database system. This system, however, also processes transactions on a "first in first out" basis which is not acceptable in critical time applications.

U.S. Pat. No. 5,006,978, to Neches, discloses a relational database system having a network for transmitting colliding packets and a plurality of processors each storing a disjoint portion of a database. Priority determining nodes are used to provide prioritized processing of messages, thus improving critical time performance. However, consistency between concurrently executing messages is not ensured.

It is, accordingly, the principal object of the present invention to provide a real time database management system which can process transactions in a concurrent and prioritized fashion, while maintaining the accuracy, security and consistency of database methods.

It is a further object of the present invention to provide such a database management system which is flexible and versatile and, therefore, useful for numerous applications.

Further objects and advantages of the present invention will be apparent to those skilled in the art after a consideration of the following disclosure of the invention.

SUMMARY OF THE INVENTION

The foregoing objects and advantages are obtained, according to the invention, by a method for providing critical time reactive management of database transactions, comprising the steps of: providing a database distributed over a plurality of sites, each site being partitioned into a plurality of objects; assigning a dynamic weight to each transaction of said number of transactions; distributing said transactions to at least one of said plurality of said sites of said database; and executing the transactions according to said dynamic weight.

The dynamic weight is determined by a procedure comprising the steps of: providing a number of predetermined scheduling factors for each transaction of said number of transactions; and assigning a dynamic weight to each transaction by combining said number of predetermined scheduling factors.

A system for accomplishing the foregoing objects and advantages, according to the invention, comprises: a database distributed over a plurality of sites, each site being partitioned into a plurality of objects; means for providing a number of transactions to be performed on said database; and means for assigning a dynamic weight to each transaction of said number of transactions, for distributing said transactions to at least one of said plurality of sites of said database, and for executing said number of transactions according to said dynamic weight.

BRIEF DESCRIPTION OF THE DRAWINGS

A detailed description of the preferred embodiments of the invention follows, with reference to the accompanying drawings, in which.

DETAILED DESCRIPTION OF THE PREFERRED EMBODIMENTS

A detailed description of the preferred embodiments of the invention will now be given.

The method, according to the invention, is designed to process database transactions called for by a Mission Critical Computer System (MCCS).

An MCCS is typically a system which requires real time or critical time access to the information stored in a distributed database having information stored at a number of different sites, such as, for example, a weapon tracking system.

Figure 1:
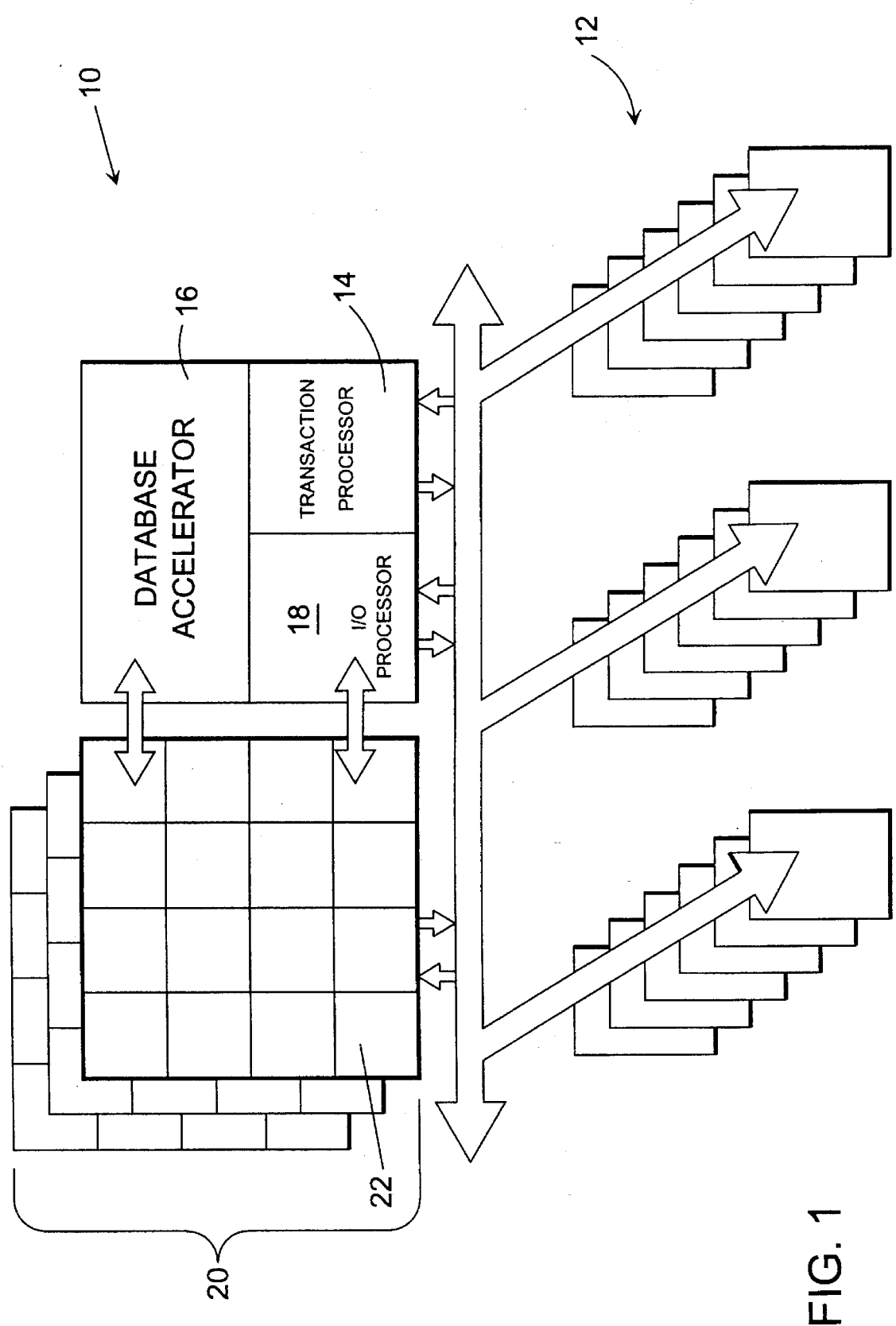
FIG. 1 is a schematic view of a database site, according to the invention.

FIG. 1 illustrates one site 10 of a database and a portion 12 of an MCCS. While only one site has been illustrated, there are, in most applications, a plurality of sites over which the database is distributed. Each site 10 preferably includes a transaction processor 14, a database accelerator 16, an In/Out processor 18 and a plurality of mass memory boards which form this portion of the database 20. At each site 10, the database 20 is partitioned into sections of data called objects 22.

An MCCS system, as needed, will issue calls for a particular transaction or series of transactions to be processed involving one or more objects in the database 20. Individual or plural transactions are initially sent by the MCCS to the transaction processor 14 at a respective site 10, where processing of a transaction(s) begins.

According to the present invention, the MCCS and the database 20 are preferably arrayed so that transactions initiated by one portion 12 of the MCCS are sent to a site 10 which is "local" to the initiating portion 12 of the system. This local site 10 will preferably contain most or all of the database information that is likely to be needed by transactions initiated by the portion 12 of the system to which the site is local.

Transactions to be processed are initially assigned a dynamic weight reflective of the time-based needs of the system. This dynamic weight is preferably assigned by the transaction processor 14, but may alternatively be assigned by the MCCS. This dynamic weight is used to ensure that the transaction which is most critical to the system will be processed first.

According to the invention, the dynamic weight of each transaction is assigned based upon a number of scheduling factors preferably supplied by the MCCS along with the transaction.

According to one embodiment of the present invention, the scheduling factors may be static criticality, dynamic deadline, and dynamic criticality.

The static criticality of a transaction is the non-changing importance of the transaction relative to other transactions which may be requested by the MCCS.

The dynamic deadline is a factor determined by forming a ratio of the total time during which a particular transaction may satisfactorily be completed to the portion of this time which remains. This ratio causes the dynamic deadline factor to increase exponentially with the passage of time, as the time remaining in the denominator of the ratio grows smaller. For example, if a transaction can satisfactorily be completed in 100 time units, and 50 time units remain, the dynamic deadline for this transaction will be 2. When 10 time units remain, the dynamic deadline is 10. When 5 time units remain, the dynamic deadline is 20, etc.

The dynamic criticality is the changing importance of the transaction relative to other transactions. This is generally represented by a bell curve because most transactions will have a window, represented by the peak of the bell curve, where the transaction is most critical. As time passes, the transaction will become less critical as compared with other transactions contending for execution.

When the scheduling factors are static criticality, dynamic deadline, and dynamic criticality, the dynamic weight of a particular transaction is obtained by combining the static criticality, dynamic deadline and dynamic criticality together. Since the dynamic deadline and dynamic criticality are constantly changing, the dynamic weight is preferably periodically updated and reassigned to ensure that the most critical transactions have the highest weight and will therefore be prioritized. The scheduling factors may be combined in any manner which provides a desirable differentiation between the dynamic weights so obtained.

According to the aforesaid preferred embodiment, the static criticality, dynamic deadline and dynamic criticality are preferably multiplied together to obtain dynamic weight. This combination or multiplication of the scheduling factors is preferably carried out by the transaction processor 14 at the site 10 to which the transaction is originally directed. It is anticipated, however, that the dynamic weight could be obtained and assigned by the MCCS as well.

The transactions invoked by the MCCS typically comprise a series of subtransactions, or portions of the transaction, which are organized into a particular structure which is preferably supplied by the MCCS. The structure is preferably based upon the relative importance of the subtransactions to each other and also on the partition structure of the database to which the transaction is directed.

Figure 2:
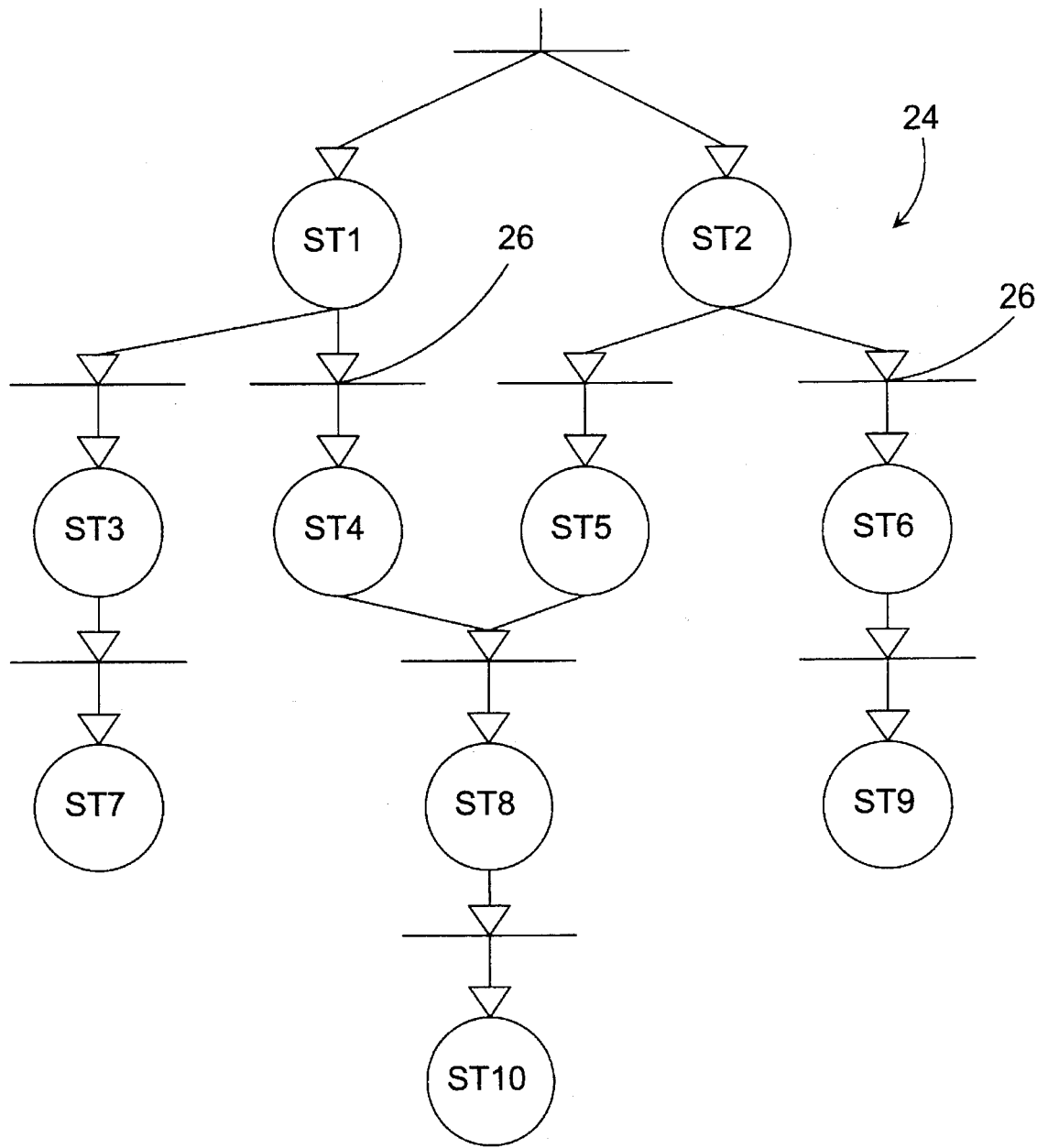
FIG. 2 is a schematic view of a transaction structure according to the invention.

A typical transaction structure 24 is illustrated in FIG. 2. In the transaction illustrated, ten subtransactions are contained in the transaction, which are denoted ST1–ST10. In this particular structure, the two most important subtransactions, ST1 and ST2, are performed first. ST1 and ST2 are the most important because ST3 through ST10 are dependent upon their execution. In the structure of FIG. 2, ST3 and ST4 depend upon ST1 and will execute upon successful completion of ST1. ST5 and ST6 depend upon ST2 and will be executed upon successful completion of ST2, and so forth. The number of subtransactions that can be executed concurrently is generally dictated by the partition structure of the database. The subtransactions typically include the performance of data manipulation techniques such as, for example, read and/or write functions. The structure of each transaction is preferably supplied by the MCCS because this information can conveniently be entered along with the transaction itself.

After the completion of each subtransaction, a decision point 26 is reached where the results of each subtransaction are evaluated, preferably by the transaction processor 14. At each decision point 26, the transaction processor 14 determines whether the executing transaction should continue or be terminated, based upon the results of the completed subtransaction. This function could also alternatively be carried out by the MCCS. ST10, or the last ST of the structure, may include an instruction to signal the MCCS of completion of the transaction so as to prepare the database for the next transaction.

In accordance with the present invention, subtransactions are assigned the dynamic weight of their parent transaction, and are distributed to the various sites of the database where they are to be executed. This function may preferably be performed by the transaction processor 14 at the site 10 to which the transaction was initially directed. The transaction or transactions of the highest dynamic weight are then selected, preferably by the transaction processor 14, and the subtransactions of this transaction are activated at their respective sites. A number of these subtransactions, determined by the transaction structure 24, are then concurrently executed upon the object 22 to which they are directed.

The processing of subtransactions is handled locally, preferably by the transaction processor 14 and I/O processor 18 at each site 10. This local management provides advantages over conventional methods as described below and as illustrated in the following example.

According to the invention, when a subtransaction begins execution on an object 22 at a particular site 10, the I/O processor 18 of that site 10 locks the access to that object to prevent other subtransactions from accessing information which may be in the process of being updated. Conventional databases lock access to all objects needed by a transaction for the entire duration of the transaction. However, because each site, according to the invention, is managed locally, the objects are made available as soon as the subtransaction directed thereto completes, or commits. This feature of the invention helps to improve the concurrent processing of transactions.

When a number of subtransactions are directed to the same object at a particular site, the local transaction processor 14 linearizes the contending subtransactions so that the effect of executing the subtransactions is as if the subtransactions were executed in descending order of their dynamic weights. The actual execution of the subtransactions may be interleaved, so long as the effect is the same as if the subtransactions were executed in this linear order. This linearizing helps to provide consistent access to the database.

The local transaction processor 14 of each site 10 also evaluates the results of each subtransaction, upon completion of the subtransaction, to determine if processing of the parent transaction should continue. Conventionally, executing transactions are evaluated, or validated, by a central controller which validates the transaction only upon completion of all subtransactions thereof. According to the present invention, however, executing transactions are validated upon completion of each subtransaction. Thus, according to the present invention, needless processing is avoided if the results of a particular subtransaction indicate that further processing of the transaction is unnecessary.

The local transaction processor 14 also furthers prioritized concurrent processing by carrying the results of subtransactions of terminated transactions forward where appropriate. Conventional database managers "undo" all processes executed by subtransactions when the parent transaction is terminated. Some of the routines performed by these subtransactions, however, are helpful in that they update existing information in the database. Thus, according to the invention, when an executing transaction is terminated, the subtransactions which have modified objects in a manner which does not depend upon completion of the transaction are not "undone".

An example illustrating the present invention follows.

EXAMPLE I

In this example, the executing transaction will have the purpose of booking the requirements for a business trip. The transaction includes three subtransactions, ST1–ST3, for fulfilling the requirements of an airline ticket (ST1), hotel reservation (ST2) and car rental (ST3).

Assuming ST1 starts processing first, it will access the database to determine whether an airline ticket is available. If no ticket is available, the database manager of the present invention will terminate the executing transaction, because hotel reservation and car rental are not necessary without an airline ticket. In a conventional manager, ST2 would reserve a hotel room and ST3 would reserve a rental car before the transaction was evaluated and found invalid.

Using the same example, the improved concurrency of the present invention will be illustrated. Conventionally, access to all objects needed by the transaction would be locked pending completion of the entire transaction. According to the present invention, however, other transactions could access the airline ticket object as soon as ST1 completes.

In this example, assuming that ST1 updates the price of an airline ticket in an object and reserves a ticket, and that ST2 finds that no hotel room is available, according to the invention, the airline reservation will be cancelled, but the new ticket price will be maintained in the database. Conventionally, both functions would be undone, returning the database to its outdated state prior to execution of the transaction.

Figure 3:
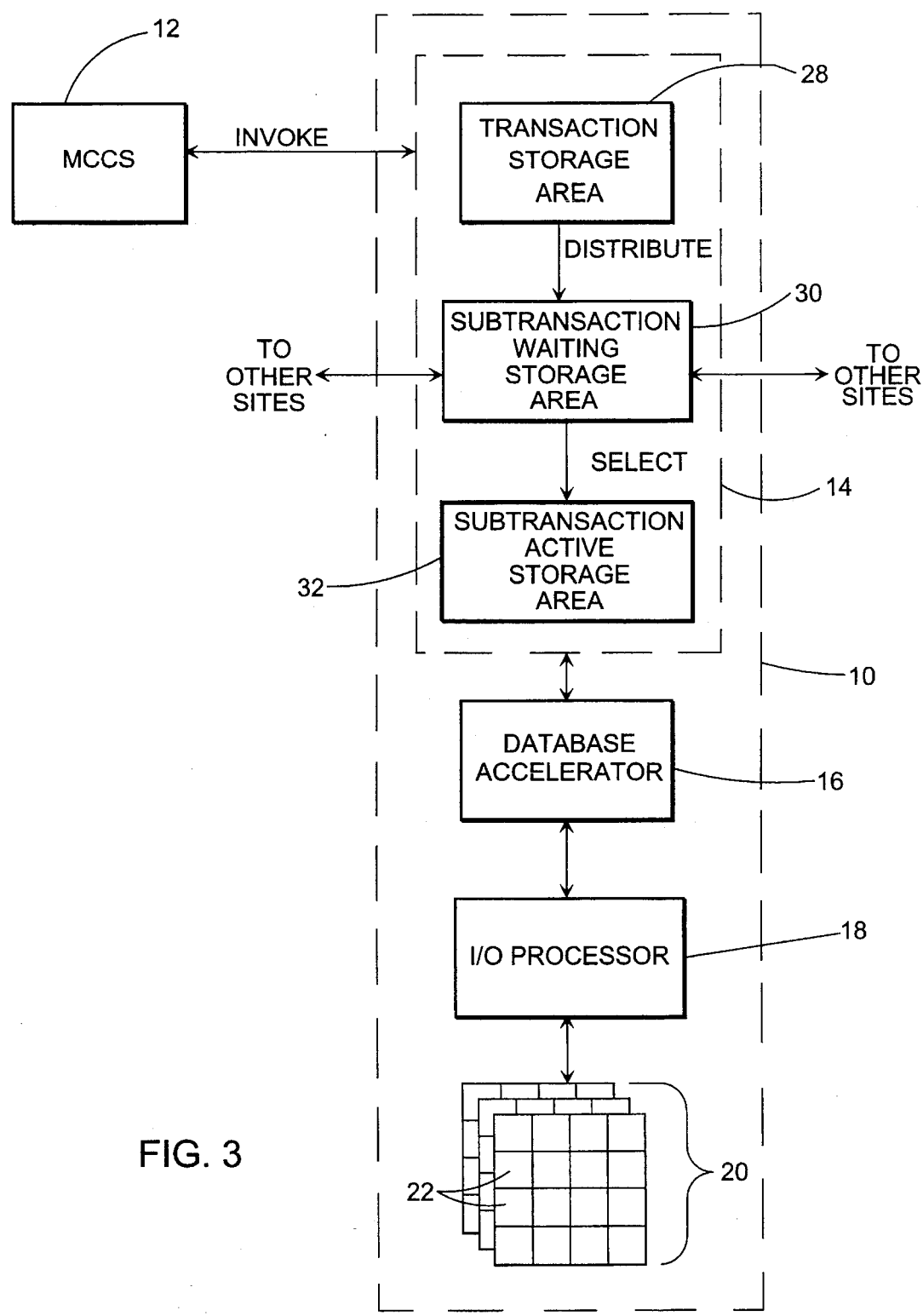
FIG. 3 is a schematic view of a database site illustrating further components of the site, according to the invention.

Referring to FIG. 3, the foregoing processing of a transaction by the transaction processor of a site is schematically illustrated. Each site preferably has at least one storage area for transactions and subtransactions which are awaiting execution. According to the most preferred embodiment, three such areas are provided. Transactions invoked by the MCCS 12 are sent to a transaction storage area 28, where they are assigned a dynamic weight, for example by the transaction processor 14. Each transaction is then distributed, by subtransaction, to subtransaction waiting storage area(s) 30 of the site(s) 10 encompassing the objects 22 to which each subtransaction is directed. The subtransactions in each subtransaction waiting storage area 30 are scheduled according to dynamic weight, and a number of subtransactions of the highest dynamic weight are selected and sent to a subtransaction active storage area 32. At this stage, the transaction processor 14 at each site 10 checks the objects 22 to which the subtransactions are directed and executes the subtransactions when the objects 22 are available.

Subtransactions contending for the same object are linearized, or scheduled, and then executed according to dynamic weight. This scheduling may be performed, for example, by the transaction processor 14, preferably in cooperation with the In/Out processor 18. Subtransactions execute their particular function upon database 20, and signal the system and the site upon which they initiated that they have completed.

It should be noted that the transactions and subtransactions at each storage area are preferably periodically reordered by transaction processor 14 to reflect changes with time in the dynamic weight of the transactions. If a subtransaction is executing on an object and a subtransaction of higher dynamic weight arrives at that object for processing, the executing subtransaction is allowed to complete at which point the more highly weighted subtransaction is executed.

Thus, the most highly weighted subtransactions will never have to wait more than one completion time before they can execute.

As will be apparent to those skilled in the art, the disclosed method can be usefully employed in any application where real time concurrent access to a database is desired.

The system according to the invention includes a database distributed as described above over a number of sites each partitioned into a number of objects and having a transaction processor 14 programmed to assign dynamic weight, and distribute and execute subtransactions and transactions as described above. Each site also preferably includes, according to the invention, a database accelerator 16 and an In/Out processor 18. The database accelerator 16 organizes and speeds instructions to and from the database 20 resulting in an overall improvement in real time responsiveness of the database manager. The In/Out processor 18 cooperates with the transaction processor 14 to linearize subtransactions contending for the same object, and locks an object while it is being operated on.

The transaction processor 14 may also preferably be adapted to validate transactions being processed, and to preserve database changes made by subtransactions of a terminated transaction if the changes do not rely upon completion of the transaction for accuracy, all as described above.

It should be noted that the above mentioned elements of the system, namely the transaction processor, In/Out processor, and database accelerator may each comprise any type of computer means programmed to perform the above functions. Thus, each transaction processor may, for example, comprise a computer programmed with the appropriate software, or containing one or more microchips incorporating the desired programming.

It is apparent that there has been provided in accordance with this invention a method for providing critical time reactive management of database transactions for a systems process which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the broad scope of the appended claims.

What is claimed is:

1. A method for providing critical time reactive management of database transactions, comprising the steps of:

providing a database distributed over a plurality of sites, each site being partitioned into a plurality of objects;

providing a number of transactions to be performed on said database;

providing a number of predetermined scheduling factors for each transaction of said number of transactions;

determining a dynamic weight by combining said number of predetermined scheduling factors;

assigning said dynamic weight to each transaction of said number of transactions;

distributing said number of transactions to at least one of said plurality of sites of said database; and executing said transactions according to said dynamic weight.

2. A method according to claim 1, further comprising the step of periodically updating and reassigning said dynamic weight for each transaction of said number of transactions.

3. A method according to claim 1, further comprising the steps of:

providing a transaction structure for each of said number of transactions, each respective transaction structure comprising at least one subtransaction directed to at least one object of said database; and assigning said dynamic weight of each transaction of said number of transactions to said at least one subtransaction of each respective transaction structure.

4. A method according to claim 3, further comprising the steps of:

distributing said at least one subtransaction to said at least one site of said database;

further distributing each subtransaction of said at least one subtransaction to a site encompassing said at least one object to which each subtransaction is directed; and linearizing all subtransactions directed to a single object according to dynamic weight.

5. A method according to claim 4, further comprising the steps of:

evaluating results of each subtransaction of an executing transaction upon completion of said subtransaction; and terminating said executing transaction when said results of said subtransaction indicate further processing is unnecessary.

6. A method according to claim 5, further comprising the step of preserving changes made to objects of said database by subtransactions of a terminated transaction when said changes are not dependent upon completion of said terminated transaction.

7. A method for providing critical time reactive management of database transactions, comprising the steps of:

providing a database distributed over a plurality of sites, each site being partitioned into a plurality of objects;

providing a number of transactions to be performed on said database;

providing a number of predetermined scheduling factors for each transaction of said number of transactions, said factors comprising a static criticality, dynamic deadline and dynamic criticality;

assigning a dynamic weight based upon said static criticality, dynamic deadline and dynamic criticality;

distributing said number of transactions to at least one of said plurality of sites of said database; and executing said transaction according to said dynamic weight.

8. A method according to claim 7, wherein said dynamic deadline is obtained by providing a ratio of a total time for completion of a transaction to a time remaining for completion of said transaction.

9. A method for ordering transactions to be performed on a database, comprising the steps of:

providing a number of transactions to be performed on the database;

providing a plurality of scheduling factors for each transaction of said number of transactions;

assigning a dynamic weight to each transaction of said number of transactions, said dynamic weight based upon a combination of said plurality of scheduling factors; and transmitting said transactions to said database for execution according to said dynamic weight.

10. A method according to claim 9, further comprising the step of periodically updating and reassigning said dynamic weight for each transaction of said number of transactions.

11. A method for ordering transactions to be performed on a database, comprising the steps of:

providing a number of transactions to be performed on the database;

providing a plurality of scheduling factors for each transaction of said number of transactions, said plurality of scheduling factors comprising a static criticality, dynamic deadline and dynamic criticality number of transactions;

assigning a dynamic weight to each transaction of said number of transactions, said dynamic weight based upon a combination of said plurality of scheduling factors; and transmitting said transactions to said database for execution according to said dynamic weight.

12. A method according to claim 11, wherein said dynamic deadline is obtained by providing a ratio of a total time for completion of a transaction to a time remaining for completion of said transaction.

13. A system for providing critical time reactive management of database transactions, comprising:

a database distributed over a plurality of sites, each site being partitioned into a plurality of objects;

means for providing a number of transactions to be performed on said database, said providing means comprising means for providing a plurality of scheduling factors for each transaction of said number of transactions; and means for assigning a dynamic weight to each transaction of said number of transactions, for distributing said transactions to at least one of said plurality of sites of said database, and for executing said number of transactions according to said dynamic weight, said means for assigning said dynamic weight comprising means for combining said scheduling factors to obtain said dynamic weight.

14. A system according to claim 13, wherein said means for assigning a dynamic weight, for distributing said transactions, and for executing said transactions comprises a plurality of transaction processors, distributed over said plurality of sites.

15. A system according to claim 13, wherein:

said means for providing a number of transactions further comprises means for assigning a transaction structure for each transaction, said transaction structure including at least one subtransaction directed to at least one object of the database; and said system further comprises means for linearizing all subtransactions directed to a single object according to dynamic weight.

16. A system according to claim 15, further comprising means for evaluating results of each subtransaction of an executing transaction upon completion of said subtransaction and for terminating said executing transaction when said results of said subtransaction indicate further processing of said executing transaction to be unnecessary.

17. A system according to claim 16, further comprising means for preserving changes made to objects of said database by subtransactions of a terminated transaction when said changes are not dependent upon completion of said terminated transaction.

18. A system according to claim 13, further comprising means for periodically updating and reassigning said dynamic weight for each transaction of said number of transactions.

* * * * *